(12) United States Patent
Tischler et al.

(10) Patent No.: US 7,007,188 B1
(45) Date of Patent: Feb. 28, 2006

(54) PRECISION BYPASS CLOCK FOR HIGH SPEED TESTING OF A DATA PROCESSOR

(75) Inventors: Brett A. Tischler, Longmont, CO (US); Steven J. Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 456 days.

(21) Appl. No.: 10/426,049

(22) Filed: Apr. 29, 2003

(51) Int. Cl.
*G06F 1/04* (2006.01)

(52) U.S. Cl. ...................................... 713/501; 713/600
(58) Field of Classification Search ................ 713/500, 713/501, 503, 600
See application file for complete search history.

(56) References Cited

U.S. PATENT DOCUMENTS

| | | | |
|---|---|---|---|
| 5,511,100 A * | 4/1996 | Lundberg et al. ........... 375/376 |
| 5,583,787 A | 12/1996 | Underwood et al. |
| 5,600,787 A | 2/1997 | Underwood et al. |
| 5,714,910 A * | 2/1998 | Skoczen et al. ................ 331/3 |
| 5,721,514 A * | 2/1998 | Crockett et al. ................ 331/3 |
| 6,052,811 A | 4/2000 | Ahsuri |
| 6,385,125 B1 * | 5/2002 | Ooishi et al. ................ 365/233 |
| 6,480,045 B1 * | 11/2002 | Albean ........................ 327/119 |

* cited by examiner

*Primary Examiner*—Dennis M. Butler
(74) *Attorney, Agent, or Firm*—Toler, Larson & Abel, LLP (57) ABSTRACT

A system clock circuit that provides a high-speed reference clock signal for operating an integrated circuit. The system clock circuit comprises a frequency combiner circuit that receives a first external clock signal having a frequency F1 and a second external clock signal having frequency F2, where F2 is an integer multiple of F1. The second external clock signal is phase-shifted by P degrees with respect to the first external clock signal. The frequency combiner circuit generates from the first and second external clock signals a first output clock signal having an operating frequency that is the sum of F1 and F2. The system clock circuit also comprises a clock selection circuit that selectively applies the first output clock signal to the integrated circuit.

22 Claims, 4 Drawing Sheets

PRECISION BYPASS CLOCK FOR HIGH SPEED TESTING OF A DATA PROCESSOR

TECHNICAL FIELD OF THE INVENTION

The present invention is generally directed to data processors and, in particular, to a clock bypass circuit for providing a test clock signals to a data processor.

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

SOC data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

Typical SOC designs use an on-chip phase-locked loop (PLL) to generate clock signals that drive the SOC components. A typical reference clock signal produced by a PLL may be in the range of, for example, 200 MHz up to 2 GHz. However, while this type of design may be sufficient for ordinary operating conditions, the use of a PLL presents unique problems when designing and/or debugging an SOC chip. It often is desirable when testing or debugging a circuit to apply a selected number of clock cycles to the circuit-under-test and to then verify the state of certain test points or registers in the circuit-under-test. Also, it is desirable in many test procedures to apply the selected number of clock cycles at full speed, while manipulating the frequency or duty cycle of perhaps one or two individual clock cycles. This is very useful for identifying and debugging the critical speed paths of an integrated circuit design.

Unfortunately, doing this is difficult, if not impossible, with a PLL. Full speed testing with a PLL does not provide the ability to control the frequency and duty cycle of an individual clock cycle. To get around this, some test procedures may use an external test clock device to apply a selected number of clock cycles. However, for high-speed CPU designs, it is not possible to apply an input clock at speeds in excess of 300 MHz without also using special signaling. Moreover, even with an external clock, it is difficult to control the frequency and duty cycle of individual clock cycles in a high-speed clock signal (e.g., 400 MHz).

Therefore, there is a need in the art for improved system-on-a-chip (SOC) devices and other large-scale integrated circuits. In particular, there is a need for improved apparatuses and methods for applying a selected number of high-speed clock cycles to an SOC device or other large-scale integrated circuit, while manipulating the duty cycle and/or phase of an individual clock cycle.

SUMMARY OF THE INVENTION

To address the above-discussed deficiencies of the prior art, it is a primary object of the present invention to provide a system clock circuit that provides a high-speed reference clock signal for operating an integrated circuit. According to an advantageous embodiment of the present invention, the system clock circuit comprises: 1) a frequency combiner circuit capable of receiving a first external clock signal having a frequency F1 and a second external clock signal having frequency F2, where F2 is an integer multiple of F1, wherein the second external clock signal is phase-shifted by P degrees with respect to the first external clock signal, and wherein the frequency combiner circuit generates from the first and second external clock signals a first output clock signal having an operating frequency that is the sum of F1 and F2; and 2) a clock selection circuit capable of selectively applying the first output clock signal to the integrated circuit.

According to one embodiment of the present invention, the frequency combiner circuit comprises an exclusive-OR gate having a first input capable of receiving the first external clock signal and a second input capable of receiving the second external clock signal.

According to another embodiment of the present invention, the clock selection circuit is further capable of selectively applying to the integrated circuit an internal clock signal generated by an internal clock source associated with the integrated circuit.

According to still another embodiment of the present invention, the internal clock source comprises a phase-locked loop.

According to yet another embodiment of the present invention, the clock selection circuit comprises a multiplexer having first input coupled to an output of the frequency combiner circuit and a second input coupled to an output of the phase-locked loop.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated circuit, including a system-on-a-chip (SOC) device.

Figure 1:
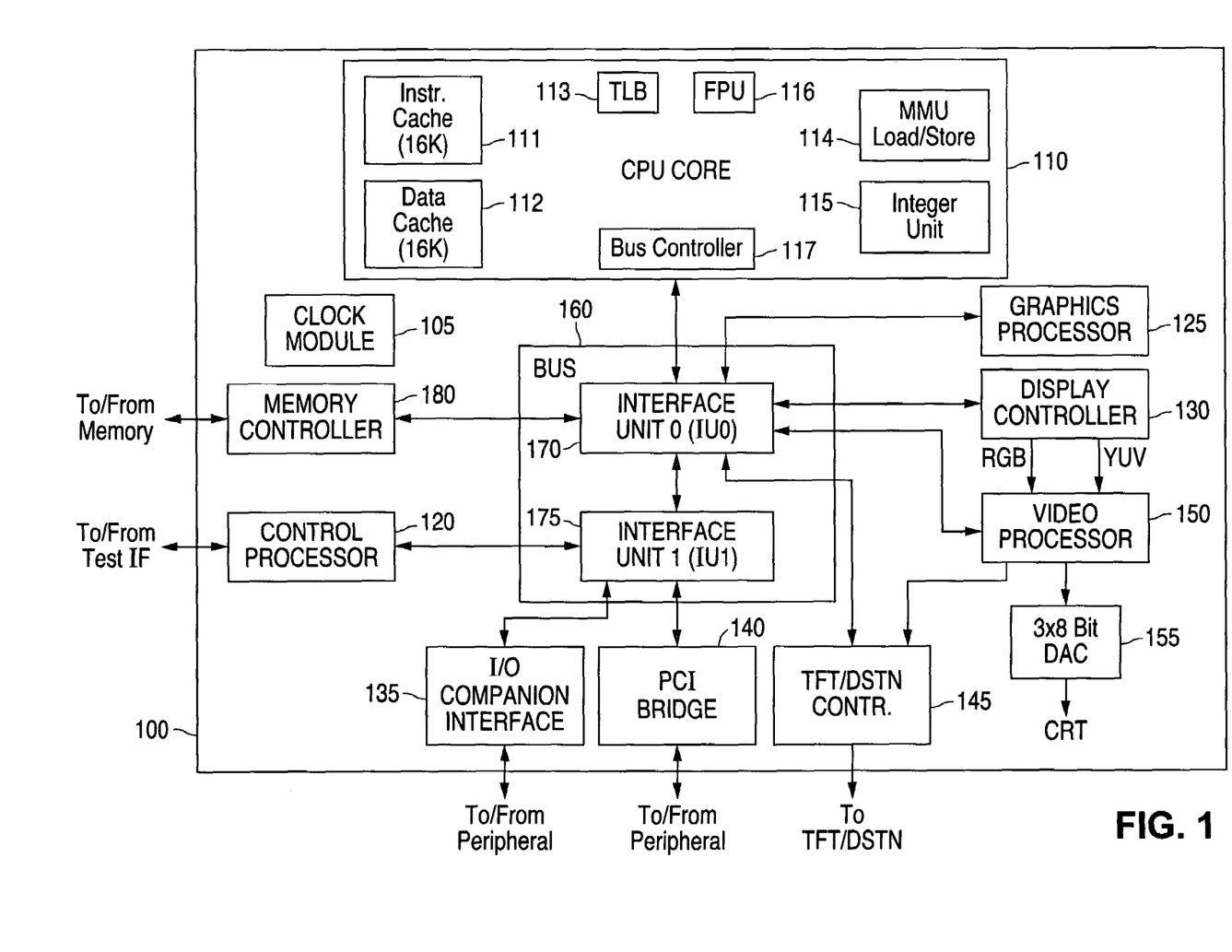
FIG. 1 illustrates an exemplary processing system according to one embodiment of the present invention.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, 3×8 bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is 16 kilobytes and data cache 112 is 16 kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor, among others.

Integer unit 115 comprises an instruction pipeline and associated logic. According to an exemplary embodiment, IU 115 consists of a single-issue eight-stage pipeline. The eight stages of the instruction pipeline in IU 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand and address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory ($\mu$ROM) is read for setup to Execution Unit stage.

In the Execution Unit stage, register and/or data memory fetches are fed through the Arithmetic Logic Unit (ALU) for arithmetic or logical operations. The $\mu$ROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies IU 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, 16 KB, 4-way set associative cache and TLB 113 may be an 8-entry, fully associative, translation look-aside buffer for data and an 8-entry, fully associative, translation look-aside buffer for instructions. TLB 113 performs necessary address translations when in protected mode.

TLB 113 may also comprise a second-level (L2) unified (instruction and data), 64-entry, 2-way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface. As the macro-clock controller and JTAG interface, control processor 120 is responsible for generating the X-OR Clock Enable signals shown in FIGS. 2A and 2B below. In an advantageous embodiment of the present invention, the circuitry shown in FIGS. 2A and 2B may be incorporated in control processor 120.

As noted above, internal bus 160 comprises two interface units: IU0 170 and IU1 175. IU0 170 connects six high-speed modules together with a seventh link to IU1 175. IU1 175 connects to three low-speed modules, namely I/O companion IF 135, PCI bridge 140, and TFT/DSTN controller 145.

Memory controller 180 is the memory source for all memory accesses in processing system 100. Memory controller 180 supports a memory data bus width of sixty-four (64) bits. Memory controller 180 supports two types of memory. The first type of memory is a 111 MHz 222 MT/S for DDR (Dual Data Rate). The second type of memory is a 133 MHz for SDR (Single Data Rate). Memory controller 180 supports up to one gigabyte (1 GB) of either SDR memory or DDR memory.

The modules that need access to memory are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes 8-bit pixels and sync signals to the GUI, which expands the pixels to 24 BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

During testing or debugging of processing system 100, it often is desirable to apply a selected number of clock cycles to processing system 100 and then verify the state of certain test points or registers in processing system 100. Also, it is desirable in many test procedures to apply the selected number of clock cycles at full speed, while manipulating the frequency or duty cycle of perhaps one or two individual clock cycles. The present invention provides a unique and novel clock bypass circuit that bypasses the internal PLL in clock module 105. The novel clock bypass circuit receives external reference clock signals at a relatively low speed and combines the external clock signals together to generate a high-speed internal test clock signal. Since the external clock signals are relatively low speed, it is possible to manipulate the duty cycles, frequencies and phase offsets of individual clock cycles in the external clock signals and have these modifications reflected in the high-speed internal test clock signal.

Figure 2A:
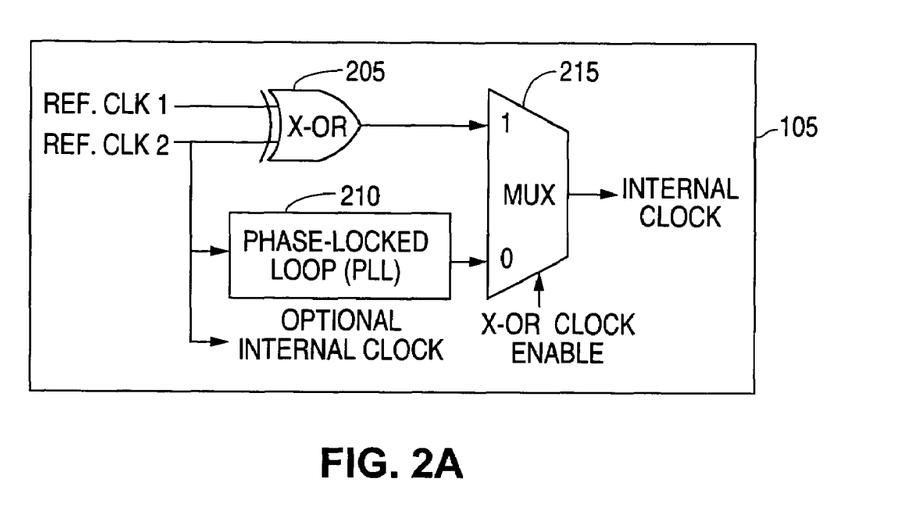
FIG. 2A illustrates clock bypass circuitry in the clock module of the exemplary processing system according to a first exemplary embodiment of the present invention.

FIG. 2A illustrates clock bypass circuitry in clock module 105 of exemplary processing system 100 according to a first exemplary embodiment of the present invention. The clock bypass circuitry comprises exclusive-OR (X-OR) gate 205, phase-locked loop (PLL) 210, and multiplexer (MUX) 215. The exemplary clock bypass circuitry receives two clock inputs, Reference Clock 1 (REF. CLK 1) and Reference Clock 2 (REF. CLK 2), and the input control signal X-OR Clock Enable, which may be generated by control processor 120. The exemplary clock bypass circuitry generates an Internal Clock signal at the output of MUX 215.

The Internal Clock signal is the clock signal that drives CPU core 110 and the rest of processing system 100. During normal operation, the X-OR Clock Enable signal is disabled (i.e., Logic 0). This causes MUX 215 to select the output of PLL 210 as the Internal Clock signal. PLL 210 receives the Reference Clock 2 signal and generates an output signal having a frequency that is N times greater than the frequency of the Reference Clock 2 signal. For example, the Reference Clock 2 signal may be a 50 MHz reference clock signal generated by a crystal oscillator located in clock module 105 or provided by an external source coupled to processing system 100. PLL 210 may then multiply the 50 MHz reference clock signal by a factor of N=8 to produce a 400 MHz output that is switched through MUX 215 to become the Internal Clock signal.

However, during testing or debug procedures, the X-OR Clock Enable signal is enabled (i.e., Logic 1). This causes MUX 215 to select the output of X-OR gate 205 as the Internal Clock signal. In the exemplary embodiment, the Reference Clock 1 and 2 signals are derived from the same external clock source, have the same frequency, and are 90 degrees phase-shifted with respect to one another. Under these input signal conditions, X-OR gate 205 adds the two frequencies together, thereby acting as a 2x frequency multiplier. X-OR gate 205 receives the Reference Clock 1 signal and the Reference Clock 2 signal and generates an output signal having a frequency that is the sum of the frequency of the Reference Clock 1 and the Reference Clock 2 signals. For example, the Reference Clock 1 and 2 signals may be 100 MHz reference clock signals generated by an external testing device coupled to processing system 100. X-OR gate 205 adds the input frequencies to produce a 200 MHz reference clock signal.

Figure 3A:
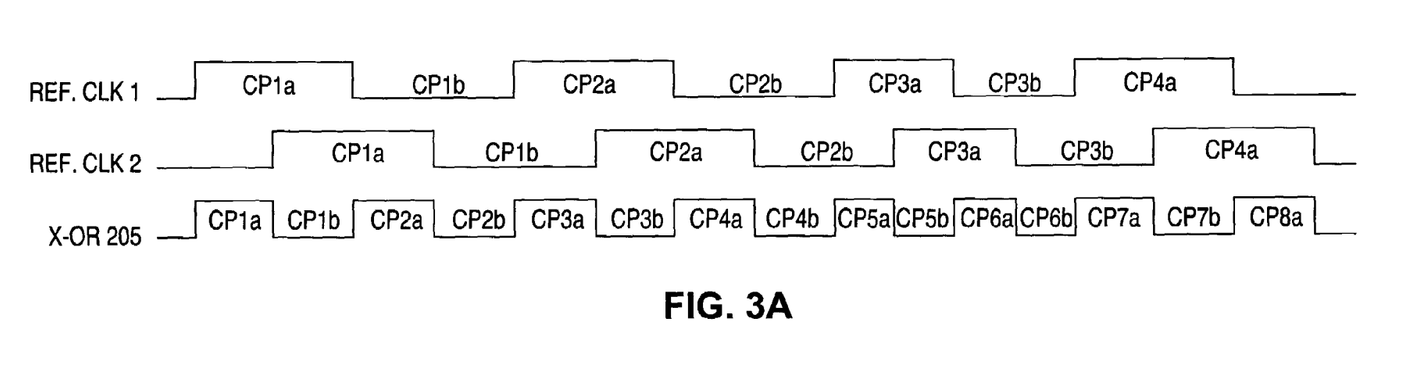
FIG. 3A is a timing diagram illustrating the operation of the clock bypass circuitry according to one embodiment of the present invention.

FIG. 3A is a timing diagram illustrating the operation of the clock bypass circuitry in FIG. 2A according to one embodiment of the present invention. As noted above, the Reference Clock 1 and 2 signals are derived from the same external clock source, have the same frequency, and are 90 degrees phase-shifted with respect to one another. When the Reference Clock 1 signal and the Reference Clock 2 signal are both Logic 1 or both Logic 0, then the output of X-OR gate 205 is Logic 0. When the Reference Clock 1 signal and the Reference Clock 2 signal are different, then the output of X-OR gate 205 is Logic 1. Because of the 90 degree phase shift, the output of X-OR gate 205 changes state at twice the rate of Reference Clock 1 signal and Reference Clock 2 signal.

Moreover, since the Reference Clock 1 signal and the Reference Clock 2 signal are at a relatively low speed (e.g., 100 MHz), it is easier for the external clock source to apply individual clock cycles in which the frequency and duty cycle are modified. By way of example, in FIG. 3A, parts of four clock cycles, CP1, CP2, CP3 and CP4 are shown. However, the CP3 clock cycles of Reference Clock 1 signal and Reference Clock 2 signal are narrower clock cycles than the CP1, CP2, and CP4 clock cycles. This causes X-OR gate 205 to output narrower clock cycles at during the CP5 and CP6 clock cycles. This is useful for speed path debugging.

Figure 2B:
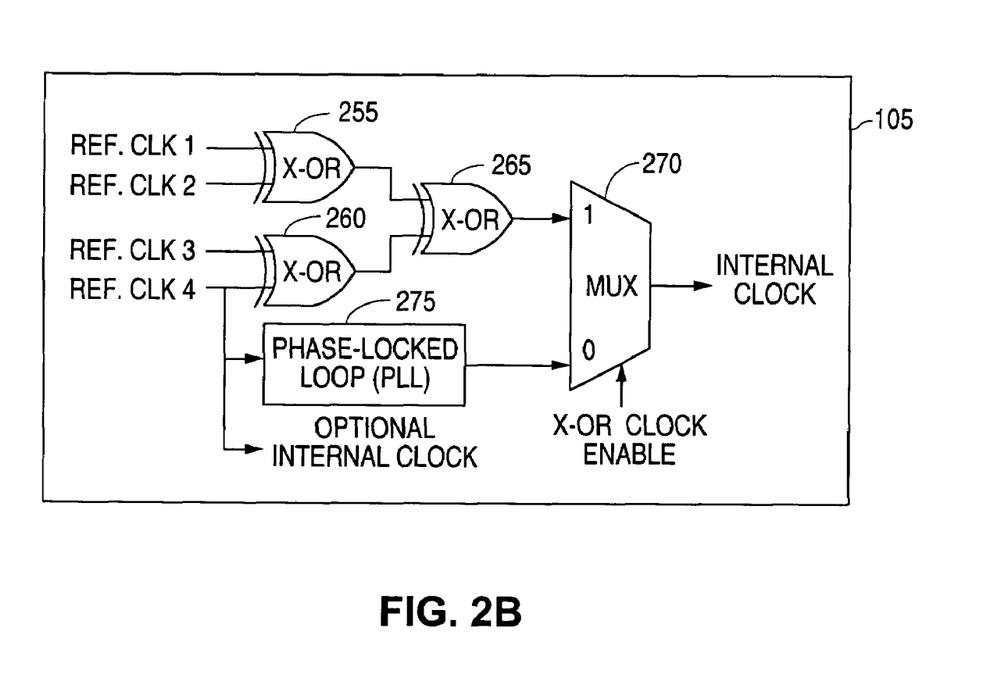
FIG. 2B illustrates clock bypass circuitry in the clock module of the exemplary processing system according to a second exemplary embodiment of the present invention.

FIG. 2B illustrates clock bypass circuitry in clock module 105 of exemplary processing system 100 according to a second exemplary embodiment of the present invention. The clock bypass circuitry comprises exclusive-OR (X-OR) gate 255, X-OR gate 260, X-OR gate 265, multiplexer (MUX) 270, and phase-locked loop (PLL) 275. The exemplary clock bypass circuitry receives four clock inputs, Reference Clock 1 (REF. CLK 1), Reference Clock 2 (REF. CLK 2), Reference Clock 3 (REF. CLK 3), and Reference Clock 4 (REF. CLK 4) and the input control signal X-OR Clock Enable. The exemplary clock bypass circuitry generates an Internal Clock signal at the output of MUX 270.

The Reference Clock 1, 2, 3 and 4 signals are derived from the same external clock source. Reference Clock 2 signal lags Reference Clock 1 signal by 90 degrees. Reference Clock 3 signal lags Reference Clock 1 signal by 45 degrees and Reference Clock 4 signal lags Reference Clock 1 signal by 135 degrees. Under these input signal conditions, each one of X-OR gates 255, 260 and 265 adds the two input frequencies that it receives. Thus, each one of X-OR gates 255, 260 and 265 acts as a frequency doubler (2x).

X-OR gate 255 generates a first 2x signal at its output and X-OF gate 260 generates a second 2x signal at its output. X-OR gate 265 receives the 2x outputs of X-OR gates 255 and 260 and adds the frequencies together again (effectively doubling the input frequencies again). This generates a 4x (overall) clock signal at the output of X-OR gate 265.

Figure 3B:
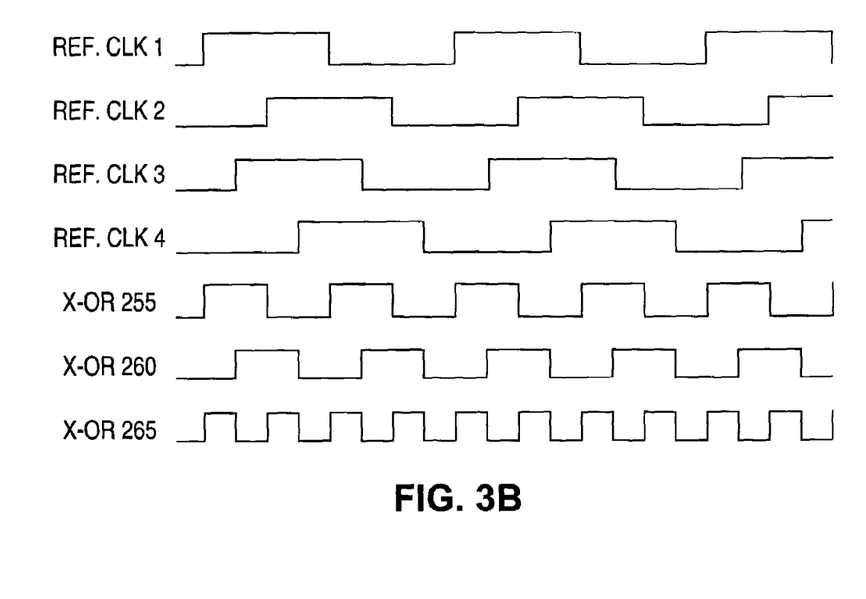
FIG. 3B is a timing diagram illustrating the operation of the clock bypass circuitry according to an alternate embodiment of the present invention.

FIG. 3B is a timing diagram illustrating the operation of the clock bypass circuitry in clock module 105 according to an alternate embodiment of the present invention. As FIG. 3B illustrates, the frequency at the output of X-OR gate 265 is four times (4x) the frequency of each one of the Reference Clock 1, 2, 3 and 4 signals. Since the Reference Clock 1, 2, 3 and 4 signals are relatively low speed (e.g., 100 MHz), it is easier for the external clock source to apply individual clock cycles in which the frequency and duty cycle are modified.

The clock bypass circuitry described above may be used to multiply the clock speed of the input clocks to even higher rates. For example, by adding more layers of exclusive-OR gates and more phase-shifted input reference clocks, the bypass clock circuitry may be used to multiply the clock speed of the input reference clocks by, for example, eight (8x), sixteen (16), thirty-two (32), and so forth. This allows the use of even lower speed programmable clock sources to test and debug processing system 100.

Additionally, it should be understood that it is not required that a 90-degree phase shift be used between two external reference clocks that are being multiplied by an exclusive-OR gate. The 90-degree phase shifts used in FIGS. 2A and 2B were selected to simplify the example and to achieve a square wave (i.e., 50% duty cycle) at the outputs of the X-OR gates. Those skilled in the art will readily understand that, in general, a phase shift of P degrees between the external clocks applied to the inputs of an X-OR gate will achieve a duty cycle of (P/180) at the output of the X-OR gate.

Figure 4:
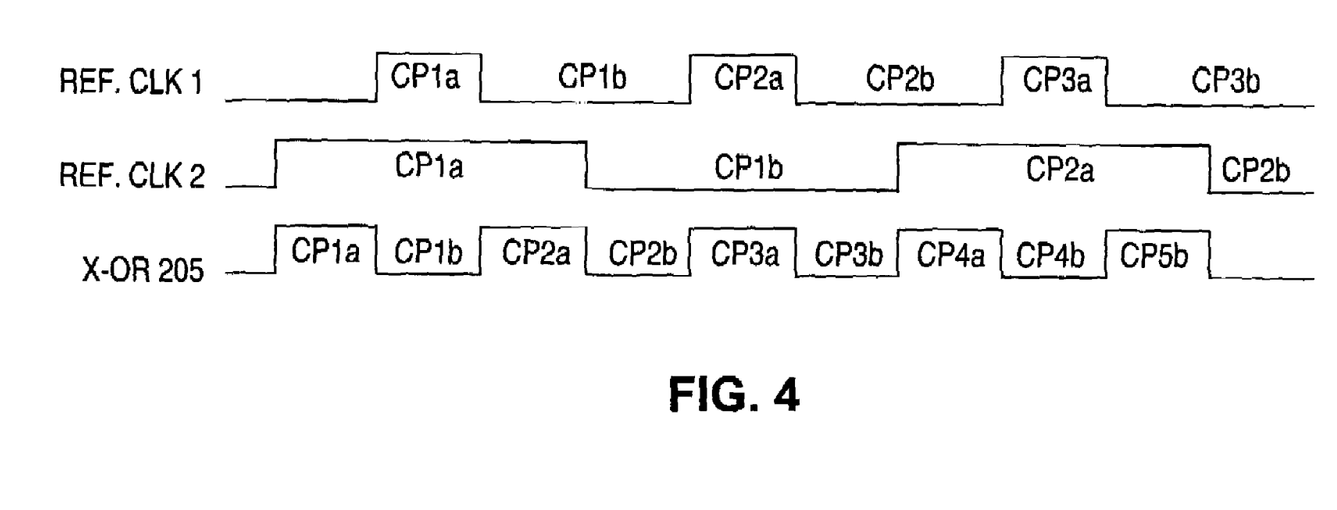
FIG. 4 is a timing diagram illustrating the operation of the clock bypass circuitry in FIG. 2A according to yet another alternate embodiment of the present invention.

Furthermore, it is not required that the frequencies of the two external reference clocks applied to the inputs of the X-OR gates be equal. An X-OR gate can combine the input frequencies of a number of different waveforms if the frequencies and phase shifts are carefully controlled. FIG. 4 is a timing diagram illustrating the operation of the clock bypass circuitry in clock module 105 in FIG. 2A according to yet another alternate embodiment of the present invention. The Reference Clock 1 and 2 signals are derived from the same external clock source, but have different frequencies and different duty cycles. The frequency of the Reference Clock 1 signal is half of the frequency of the Reference Clock 2 signal. Also, the Reference Clock 1 signal has a duty cycle of one third (33.33%). Finally, the rising edges of the Reference Clock 1 Signal are offset from rising/falling edges in the Reference Clock 2 signal by one sixth (or 60 degrees) of the period of the Reference Clock 2 signal.

Under these signal conditions, X-OR gate 205 adds the input frequencies of the Reference Clock 1 and 2 signals to produce the output signal from X-OR gate 205 shown in FIG. 4. For example, if Reference Clock 1 signal is 100 MHz and Reference Clock 2 signal is 50 MHz, the output of X-OR gate 205 has a frequency of 150 MHz.

In general, an X-OR gate may be used to combine the frequencies of any two input reference signals. A stable output signal having a frequency equal to the sum of the input frequencies will be produced, provided that a first one of the input reference signals has a frequency of F1 and the second one of the input reference signals has a frequency of F2, where F2=n(F1) and n is an integer greater than or equal to 1, and provided that there is an offset (or phase shift) between the rising and falling edges of the first and second waveforms.

The flexibility of the XOR gate to combine varying input frequencies into a higher frequency internal clock allows one of the input frequencies to be used for clocking alternate logic in the design. As shown in FIGS. 2A and 2B, in addition to the high-speed Internal Clock signal generated from the XOR gates, one of the input clocks can also be used as an Optional Internal Clock signal. For example, this Optional Internal Clock signal may clock some low-frequency I/O logic, such as a PCI interface, while the Internal Clock signal is used to clock the high-speed CPU core.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in an integrated circuit operating from a high-speed reference clock signal, a system clock circuit for providing said high-speed reference clock signal to said integrated circuit comprising:
a frequency combiner circuit capable of receiving a first external clock signal having a frequency F1 and a second external clock signal having frequency F2, where F2 is an integer multiple of F1, wherein said second external clock signal is phase-shifted by P degrees with respect to said first external clock signal, and wherein said frequency combiner circuit generates from said first and second external clock signals a first output clock signal having an operating frequency that is the sum of F1 and F2; and
a clock selection circuit capable of selectively applying said first output clock signal to said integrated circuit.

2. The system clock circuit as set forth in claim 1 wherein said frequency combiner circuit comprises an exclusive-OR gate having a first input capable of receiving said first external clock signal and a second input capable of receiving said second external clock signal.

3. The system clock circuit as set forth in claim 2 wherein said clock selection circuit is further capable of selectively applying to said integrated circuit an internal clock signal generated by an internal clock source associated with said integrated circuit.

4. The system clock circuit as set forth in claim 3 wherein said internal clock source comprises a phase-locked loop.

5. The system clock circuit as set forth in claim 4 wherein said clock selection circuit comprises a multiplexer having first input coupled to an output of said frequency combiner circuit and a second input coupled to an output of said phase-locked loop.

6. For use in an integrated circuit operating from a high-speed reference clock signal, a system clock circuit for providing said high-speed reference clock signal to said integrated circuit comprising:
a frequency combiner circuit capable of receiving N external clock signals, wherein each of said N external clock signals has a frequency that is an integer multiple of a fundamental one of said N external clock signals and each of said N external clock signals is phase-shifted with respect to said fundamental external clock signal, and wherein said frequency combiner circuit generates from said N external clock signals a first output clock signal having an operating frequency that is the sum of the frequencies of said N external clock signals; and
a clock selection circuit capable of selectively applying said first output clock signal to said integrated circuit.

7. The system clock circuit as set forth in claim 6 wherein said frequency combiner circuit comprises a first plurality of exclusive-OR gates, each of said first plurality of exclusive-OR gates having a first input capable of receiving a first one of said N external clock signals and a second input capable of receiving a second one of said external clock signals.

8. The system clock circuit as set forth in claim 7 wherein said clock selection circuit is further capable of selectively applying to said integrated circuit an internal clock signal generated by an internal clock source associated with said integrated circuit.

9. The system clock circuit as set forth in claim 8 wherein said internal clock source comprises a phase-locked loop.

10. The system clock circuit as set forth in claim 9 wherein said clock selection circuit comprises a multiplexer having first input coupled to an output of said frequency combiner circuit and a second input coupled to an output of said phase-locked loop.

11. The system clock circuit as set forth in claim 7 wherein said frequency combiner circuit further comprises a second plurality of exclusive-OR gates, each of said second plurality of exclusive-OR gates having a first input capable of receiving an output of a first one of said first plurality of exclusive-OR gates and a second input capable of receiving an output of a second one of said first plurality of exclusive-OR gates.

12. An integrated circuit comprising:
a processor core;
a memory;
a plurality of peripheral devices; and
an internal bus for transferring data between said processor core, said memory and said peripheral devices;
a system clock circuit for providing a high-speed reference clock signal to said processor core, said memory and said peripheral devices, said system clock circuit comprising:
a frequency combiner circuit capable of receiving N external clock signals, wherein each of said N external clock signals has a frequency that is an integer multiple of a fundamental one of said N external clock signals and each of said N external clock signals is phase-shifted with respect to said fundamental external clock signal, and wherein said frequency combiner circuit generates from said N external clock signals a first output clock signal having an operating frequency that is the sum of the frequencies of said N external clock signals; and
a clock selection circuit capable of selectively applying said first output clock signal to said integrated circuit.

13. The integrated circuit as set forth in claim 12 wherein said frequency combiner circuit comprises a first plurality of exclusive-OR gates, each of said first plurality of exclusive-OR gates having a first input capable of receiving a first one of said N external clock signals and a second input capable of receiving a second one of said external clock signals.

14. The integrated circuit as set forth in claim 13 wherein said clock selection circuit is further capable of selectively applying to said integrated circuit an internal clock signal generated by an internal clock source associated with said integrated circuit.

15. The integrated circuit as set forth in claim 14 wherein said internal clock source comprises a phase-locked loop.

16. The integrated circuit as set forth in claim 15 wherein said clock selection circuit comprises a multiplexer having first input coupled to an output of said frequency combiner circuit and a second input coupled to an output of said phase-locked loop.

17. The integrated circuit as set forth in claim 13 wherein said frequency combiner circuit further comprises a second plurality of exclusive-OR gates, each of said second plurality of exclusive-OR gates having a first input capable of receiving an output of a first one of said first plurality of exclusive-OR gates and a second input capable of receiving an output of a second one of said first plurality of exclusive-OR gates.

18. A method of providing a high-speed reference clock signal to an integrated circuit comprising the steps of:
applying to the inputs of a frequency combiner circuit N external clock signals, wherein each of the N external clock signals has a frequency that is an integer multiple of a fundamental one of the N external clock signals and each of the N external clock signals is phase-shifted with respect to the fundamental external clock signal;
in the frequency combiner circuit, generating from the N external clock signals a first output clock signal having an operating frequency that is the sum of the frequencies of the N external clock signals; and
selectively applying the first output clock signal to the integrated circuit.

19. The method as set forth in claim 18 wherein the frequency combiner circuit comprises a first plurality of exclusive-OR gates, each of the first plurality of exclusive-OR gates having a first input capable of receiving a first one of the N external clock signals and a second input capable of receiving a second one of the external clock signals.

20. The method as set forth in claim 19 further comprising the step of selectively applying to the integrated circuit an internal clock signal generated by an internal clock source associated with the integrated circuit.

21. The method as set forth in claim 20 wherein the internal clock source comprises a phase-locked loop.

22. The method as set forth in claim 19 wherein the frequency combiner circuit further comprises a second plurality of exclusive-OR gates, each of the second plurality of exclusive-OR gates having a first input capable of receiving an output of a first one of the first plurality of exclusive-OR gates and a second input capable of receiving an output of a second one of the first plurality of exclusive-OR gates.

* * * * *